US006768525B2

United States Patent
Paolini et al.

(10) Patent No.: US 6,768,525 B2
(45) Date of Patent: Jul. 27, 2004

(54) COLOR ISOLATED BACKLIGHT FOR AN LCD

(75) Inventors: Steven Paolini, Saratoga, CA (US);
Gerard Harbers, Anjervallie (NL);
Wayne L. Snyder, Palo Alto, CA (US)

(73) Assignee: Lumileds Lighting U.S. LLC, San Jose, CA (US)

( * ) Notice: Subject to any disclaimer, the term of this patent is extended or adjusted under 35 U.S.C. 154(b) by 279 days.

(21) Appl. No.: 09/728,883

(22) Filed: Dec. 1, 2000

(65) Prior Publication Data

US 2002/0067444 A1 Jun. 6, 2002

(51) Int. Cl.$^7$ .............................................. G02F 1/1335
(52) U.S. Cl. ........................ 349/65; 385/901; 362/545
(58) Field of Search .............................. 349/61–65, 108, 349/159; 362/545; 385/901; 345/418

(56) References Cited

U.S. PATENT DOCUMENTS

| | | | | |
|---|---|---|---|---|
| 5,359,345 A | * | 10/1994 | Hunter | 345/102 |
| 5,857,761 A | * | 1/1999 | Abe et al. | 362/551 |
| 6,104,371 A | * | 8/2000 | Wang et al. | 345/102 |
| 6,243,068 B1 | * | 6/2001 | Evanicky et al. | 345/102 |
| 6,288,700 B1 | * | 9/2001 | Mori | 345/102 |
| 6,304,703 B1 | * | 10/2001 | Lowry | 385/120 |

FOREIGN PATENT DOCUMENTS

| | | | | |
|---|---|---|---|---|
| JP | 2000121296 | * | 6/2000 | G02F/1/1335 |
| JP | 2000171796 A | * | 6/2000 | F21V/8/00 |
| JP | 2000171796 | * | 6/2000 | G02F/1/1335 |

* cited by examiner

Primary Examiner—Robert H. Kim
Assistant Examiner—P. R. Akkapeddi
(74) Attorney, Agent, or Firm—Patent Law Group LLP; Brian D. Ogonowsky

(57) ABSTRACT

A color, transmissive LCD is described herein which uses red, green, and blue LEDs as the light source. The R, G, and B LEDs are coupled to separate light guides, one light guide for each color. These light guides may take the form of three overlying plastic or glass sheets. In another embodiment, thin fiber optic cables arranged parallel to each other on a supporting surface are used as the light guides, and each fiber optic cable is optically coupled to only one R, G, or B LED in a repeating pattern. The light guides contain deformities to emit light coinciding with the positions of the red, green, and blue pixels. The R, G, and B LEDs are constantly on, and there is no color filtering.

16 Claims, 2 Drawing Sheets

COLOR ISOLATED BACKLIGHT FOR AN LCD

FIELD OF THE INVENTION

This invention relates to color liquid crystal displays and, in particular, to a technique for backlighting a color liquid crystal display.

BACKGROUND

Liquid crystal displays (LCDs) are commonly used in battery operated equipment, such as cell phones, personal digital assistants (PDAs), and laptop computers, and are becoming popular for desktop and television applications, where they replace bulky CRTs. Presently, drawbacks of such LCDs include limited brightness, low efficiency, and limited viewing angle. LCDs can be monochrome or color and can be transmissive or reflective. The present invention deals with a color, transmissive LCD that requires backlighting, where the backlighting contains red, green, and blue components.

FIG. 1 is a cross-sectional view of a small portion of a prior art color, transmissive LCD. There are other types of color, transmissive LCD structures. The structure of FIG. 1 will be used to identify certain disadvantages of prior art LCDs that are avoided by the present invention.

In FIG. 1, an LCD 10 includes a white light source 12 to provide backlighting for the upper LCD layers. A common source for white light is a fluorescent bulb. Another white light source is a combination of red, green, and blue light emitting diodes (LEDs) whose combined light forms white light. Other white light sources are known. These white light sources must provide homogeneous light to the back surface of the display. A popular technique for providing such a homogeneous white light is to optically couple the fluorescent bulb or LEDs to a light guide, such as by optically coupling the light source to one or more edges of a sheet of clear plastic. The sheet has deformities that bend the light approximately normal to the top surface of the sheet so that light is emitted from the top surface. Examples of such deformities include ridges in the bottom surface, reflective particles embedded into the plastic sheet, or a roughening of the top or bottom surface of the sheet. The deformities cause a quasi-uniform plane of light to be emitted out the front surface of the light guide. A reflector may be placed behind the back surface of the light guide to improve brightness and uniformity.

It is also common to not use any light guide, wherein a light source positioned behind the display is provided with appropriate diffusers to uniformly distribute the light across the display.

A polarizing filter 14 linearly polarizes the white light. In the embodiment shown in FIG. 1, the polarizing filter 14 is formed in a glass substrate having transparent conductors.

Above the polarizing filter 14 is a liquid crystal layer 16, and above liquid crystal layer 16 is a glass substrate 18 having transparent conductors. Selected conductors in the glass substrates are energized by display control signals coupled to the electrodes 19, 20. The absence of an electrical field across a pixel area of the liquid crystal layer 16 causes light passing through that pixel area to have its polarization rotated orthogonal to the incoming polarization. An electrical field across a pixel area of the liquid crystal layer 16 causes the liquid crystals to align and not affect the polarity of light. Selectively energizing the conductors controls the localized electric fields across the liquid crystal layer 16. Both normally open (white) and normally closed (black) shutters are used in different displays.

Instead of a passive conductor array, a transparent thin film transistor (TFT) array may be used, having one transistor for each pixel. TFT arrays are extremely well known and need not be further described.

The light output from the glass substrate 18 is then filtered by an RGB pixel filter 22. The RGB pixel filter 22 may be comprised of a red filter layer, a green filter layer, and a blue filter layer. The layers may be deposited as thin films. As an example, the red filter contains an array of red light filter areas coinciding with the red pixel areas of the display. The remaining portions of the red filter are clear to allow other light to pass. Accordingly, the RGB pixel filter 22 provides a filter for each R, G, and B pixel in the display.

A polarizing filter 24 only passes polarized light orthogonal to the light output from the polarizing filter 14. Therefore, the polarizing filter 24 only passes light that has been polarized by a non-energized pixel area in the liquid crystal layer 16 and absorbs all light that passes through the energized portions of the liquid crystal layer 16. The magnitudes of the electric fields across the liquid crystal layer 16 control the brightness of the individual R, G, and B components to create any color. In this manner, any color image may be presented to the viewer by selectively energizing the various conductors.

The RGB pixel filter 22 inherently filters two-thirds of all light reaching it, since each filter only allows one of the three primary colors to pass. This is a significant factor in the generally poor efficiency of the prior art LCDs. The overall transmissivity of the LCD layers above the white light source 12 is on the order of 4–10%. What is needed is a technique for increasing the brightness of an LCD output without requiring additional energy for the white light source.

FIG. 2 illustrates another prior art color LCD. The layer labeled LCD layers 28 may include all the layers in FIG. 1 except for the RGB pixel filter 22 or may be any other layers for implementing an LCD. FIG. 2 does not use a white light source but instead sequentially energizes red, green, and blue light sources 30, such as red, green, and blue LEDs. A light guide 32 typically receives the RGB light along one or more of its edges and bends the light toward the LCD layers 28 using any one of a number of well known techniques. Sequentially energizing the RGB light sources requires synchronization with the energization of the TFT array. Additionally, to avoid any perceivable flicker, the R, G, and B light sources must each be energized at a frequency of at least 180 Hz to accommodate all three colors sequentially at 60 frames per second. The switching speed may need to be even faster to account for motion artifacts such as those caused by the viewer moving his head while viewing the display. Problems with slow switching speed of the shutter (LC+TFT) and motion artifacts will likely keep this approach impractical for at least several more years.

SUMMARY

A color, transmissive LCD is described herein which uses red, green, and blue LEDs as the light source. The R, G, and B LEDs are coupled to separate light guides, one light guide for each color. These light guides may take the form of three overlying plastic or glass sheets. In another embodiment, thin fiber optic cables arranged parallel to each other on a supporting surface are used as the light guides, and each fiber optic cable is optically coupled to only one R, G, or B LED in a repeating RGB pattern. The light guides contain deformities coinciding with the positions of the red, green, and blue pixels. These deformities may be any of those used in the prior art for "leaking" light out of the light guide. The R, G, and B LEDs are constantly on, and there is no color filtering.

In one embodiment, the LCD has red pixels arranged in a column, green pixels arranged in an adjacent parallel column, and blue pixels arranged in a column adjacent to the green pixels. The pattern repeats. For this type of display, the deformities on each of the light guides are arranged in strips coinciding with the columns of pixels for the particular color transmitted by the light guide. For this type of embodiment, fiber optic cables as light guides are particularly suitable since the light of a particular color is inherently restricted to a column by the fiber optic cable. The thickness of each cable is approximately equal to the width of a pixel.

Since the inventive backlighting technique allows the RGB LEDs to be on 100% of the time, unlike the technique shown in FIG. 2, and no RGB pixel filter is required, unlike the technique shown in FIG. 1, the LCD uses much less energy to provide the same brightness as the prior art displays.

DETAILED DESCRIPTION

Figure 3:
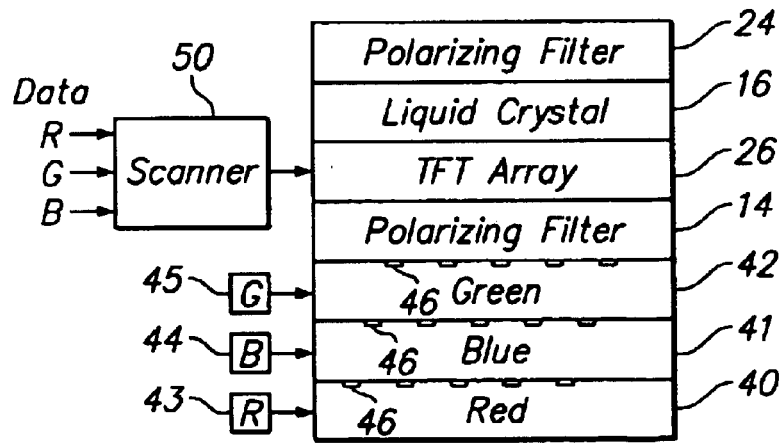
FIG. 3 is a cross-section of a portion of an LCD illustrating one embodiment of the present invention using dedicated red, green, and blue light guides.

FIG. 3 is a cross-sectional view of a portion of an LCD in accordance with one embodiment of the invention. The layers above the backlight may be identical to those in FIG. 1 except for the elimination of the RGB pixel filter 22. The passive conductor grid, described with respect to FIG. 1, can be replaced with a well known thin film transistor (TFT) array 26. Additional information about liquid crystal displays may be found in the books entitled "Liquid Crystal Flat Panel Displays," by William O'Mara, 1993, published by Van Nostrand Reinhold, and "Color TFT Liquid Crystal Displays," by T. Yamazaki, published by SEMI, incorporated herein by reference.

The backlight portion includes three transparent light guides designated as a red light guide 40, a blue light guide 41, and a green light guide 42, each optically coupled to respective red, blue, and green LEDs 43–45.

These light guides 40–42 are preferably formed of high optical quality plastic or glass. The thickness of each light guide layer is dependent upon various factors, such as the size of the LCD and its required mechanical properties. The thicknesses of the light guides 40–42 should be as thin as practical to limit the spreading of the light through any overlying light guide layers. It is desirable for the backlight illuminance of the polarizing filter 14 to be set so that the ratio of light from each color achieves the desired white point. This is an important feature that LEDs provide over fluorescent lamps where the ratios of RGB light are fixed. To obtain the desired illumination characteristics for all three colors incident on the polarizing filter 14, the LED energizing signals may be adjusted or the deformity characteristics for each light guide may be adjusted to achieve the required intensity of light exiting each light guide 40–42.

The relative positions of these deformities 46 are shown in FIG. 3. As seen, the deformities 46 are staggered for each color to coincide with the position of each color pixel along the viewing area of the LCD. These deformities 46 may take any of a number of shapes. In one embodiment, deformities 46 are simply pits or other aberrations in either the top or bottom surface of the light guides 40–42. Examples of such deformities are described in U.S. Pat. Nos. 6,072,551; 5,876,107; 5,857,761; and 4,573,766, all incorporated herein by reference.

Figure 4:
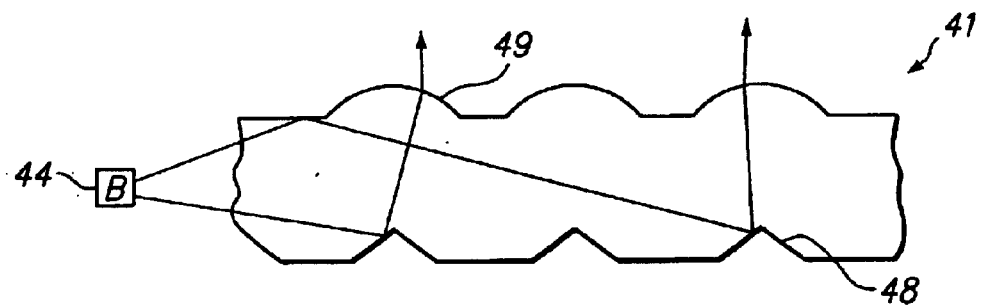
FIG. 4 is a cross-section of a portion of one light guide showing isolated deformities on a back surface of the light guide for reflecting light through collimating lenses on the front surface in those areas corresponding to a pixel of that color.

Although the deformities 46 in FIG. 3 are shown formed in the top surface of the light guides, the deformities may be formed in the bottom surface of the light guides. One type of deformity is shown in FIG. 4 and consists of angled grooves 48 formed in the bottom surface of a light guide in those areas at which it is desired to bend the light approximately normal to the top surface of the light guide. A portion of the blue light guide 41 is shown in FIG. 4, where the grooves 48 are formed on the bottom surface of the light guide only in the blue pixel areas. The blue light from the LED 44 (FIG. 3) enters the side of the light guide 41 at a limited angle (+/−20°) and is completely internally reflected until the light reflects off an angled groove surface and is incident on the upper surface of the light guide at less than the critical angle. Lenses 49 act to collimate the light to direct the light to the blue pixel areas. By proper selection of these lenses and grooves, the directionality of the reflected light can be adjusted. Of course, there are many suitable forms of lenses and deformities that can be used to output light from the light guides.

In FIG. 3, the order of the light guides 40–42 has been selected such that the most efficient color LED, red, illuminates the bottom light guide 40 so that any attenuation by the green and blue light guides can be compensated most efficiently by adjusting the current through the red LED. The green component for white light is higher than the blue and red components so should undergo the least attenuation. To make white light, about 65% of the light needs to be green independent of the light source. The optimum order of the light guides will depend on the particular LEDs used. Ideally, the R, G, and B intensities output by the LCD should be controllable to create white light or other gray scale (neutral) light.

The relative efficiencies may change over time, so a dynamic adjustment (e.g., using photodetector feedback) can be made to the energizing signals to compensate for any change in brightness.

Figure 5:
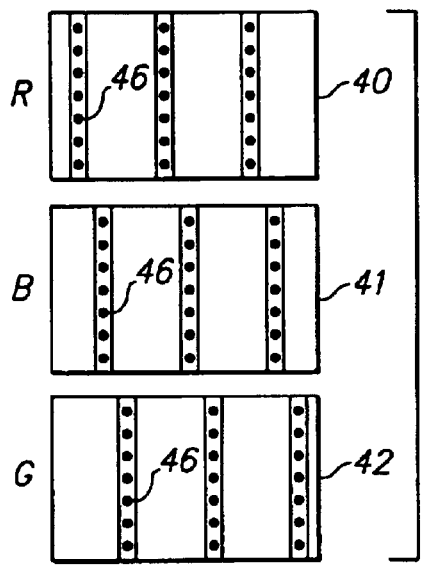
FIG. 5 is a top down view of a portion of light guides transmitting red, green, and blue light, illustrating the deformities arranged in strips to coincide with the locations of pixels of that color on the LCD.

FIG. 5 is a top view of a portion of each of the light guides 40, 41, and 42 illustrating a pattern of deformities 46 on a surface of, or internal to, each of the light guides. The pixel layout in certain types of LCDs have the red pixels aligned in a vertical column, the green pixels aligned in a column adjacent the red pixels, and the blue pixels aligned in a column adjacent the green columns. The deformities 46 for reflecting light out of the light guides are staggered so that the different colors do not overlap. These light emitting areas will be selectively "shuttered" by the liquid crystal layer 16 (FIG. 3), acting as a light valve, to reveal portions of the column of red, green, and blue light corresponding to the pixel to be displayed.

Standard pixel arrangement for monitors and the like include an HDTV standard of 1280×1024 pixels or lower resolutions of 640×480 and 320×240. The pitch of the pixels are of course determined by the desired size of the LCD and the number of pixels. For simple displays, such as in cell phones, fewer pixels may be acceptable.

Figure 1:
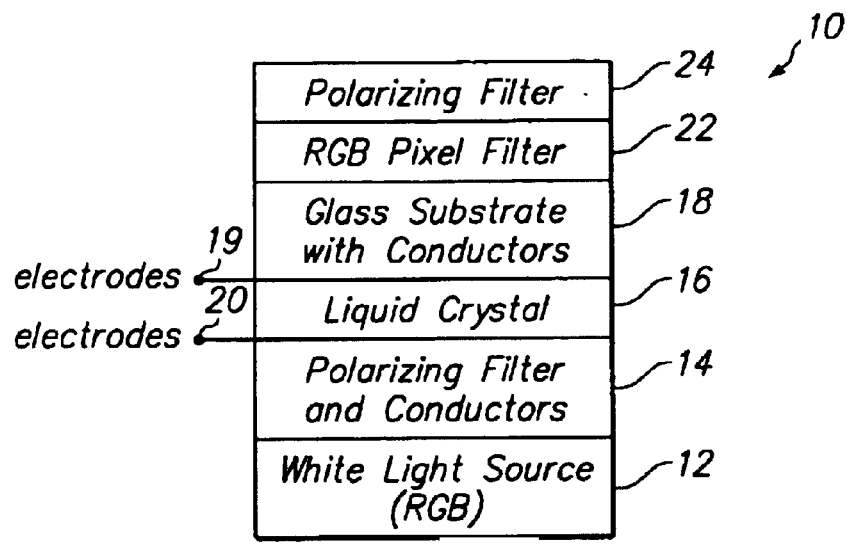
FIG. 1 is a cross-section of a prior art color, transmissive LCD using a constantly on white light source.
Figure 2:
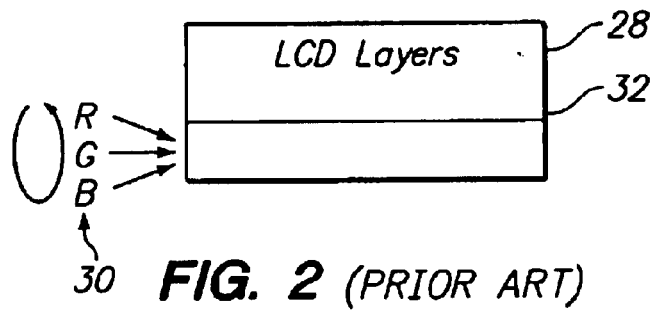
FIG. 2 is a cross-section of a prior art LCD using separate red, green, and blue light sources that are sequentially energized.

Using the technique shown in FIG. 3, the 66% loss incurred by the RGB pixel filter 22 of FIG. 1 is eliminated, and the constantly on red, green, and blue LEDs avoids the drawbacks of high switching speed, flicker, and synchronization, as compared to FIG. 2.

In FIG. 3, a conventional scanner 50, well known to those skilled in the art, receives red, green, and blue data from a conventional circuit and selectively energizes the transistors in the TFT array 26 using known row and column addressing circuitry. Using the technique of FIG. 3, there is no requirement that a first scan of the array be only for the red pixels (in contrast to FIG. 2), but instead, the red, green, and blue pixels may be sequentially "shuttered" in a serpentine fashion since the red, green, and blue backlighting is constantly on. Further, any type of control of the TFT array 26 (or a passive conductor grid) may be used, including energizing more than one pixel at a time.

Figure 6:
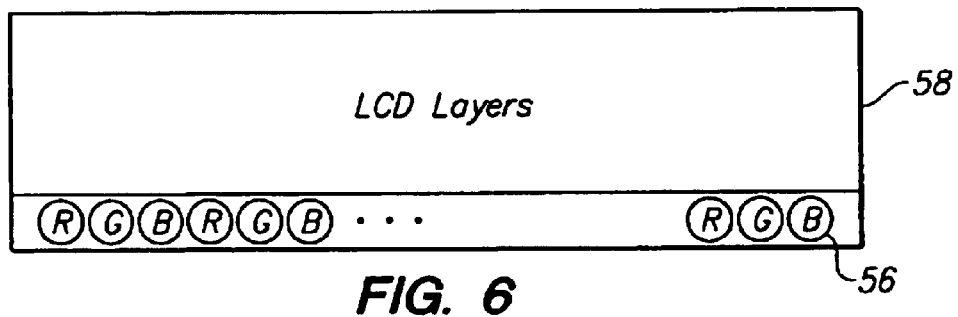
FIG. 6 is a cross-section of an LCD illustrating an embodiment of the invention using fiber optic cable as light guides for backlighting.

FIG. 6 is a cross-sectional view of a portion of an LCD in accordance with another embodiment of the invention, where the light guides are fiber optic cables 56 arranged in plane parallel to each other. The overlying LCD layers 58 may be the same layers shown in FIG. 3 or any other layers used in LCDs.

Figure 7:
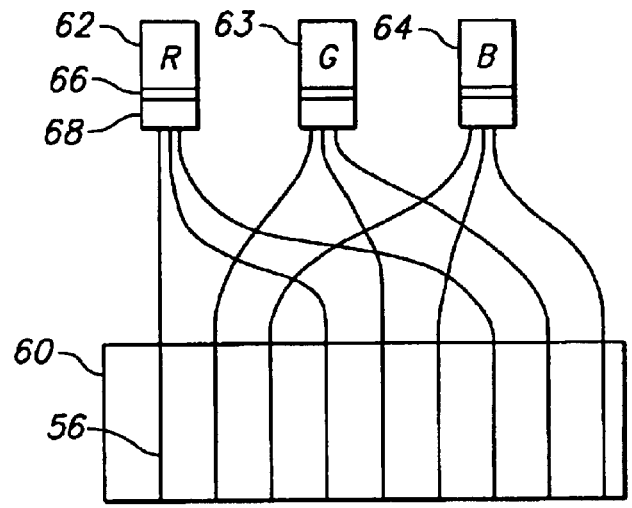
FIG. 7 is a top down view of the backlight of FIG. 6 showing the arrangement of fiber optic cables on a supporting structure and their connection to red, green, and blue LEDs.

FIG. 7 is a top down view illustrating the arrangement of fiber optic cables 56 on a supporting structure 60 and their connection to red, green, and blue LEDs 62–64. Depending on the fiber optic cable used, it may be desirable for the fiber optic cables to not actually touch one another to eliminate leakage into adjacent fiber optic cables.

Coupling a bundle of fiber optic cables to an LED is well known. A diffuser 66 for each LED may be used, if necessary, to cause the light source to be more homogenous. A collimator 68 may be used, if necessary, to improve the light coupling to the fiber optic cables 56.

To prevent light from exiting the ends of the fiber optic cables and being wasted, the ends may be cut at an angle, a reflective coating may be deposited on the ends, or both ends of the fiber optic cables may be terminated by an LED. Deformities are formed in the top or bottom surface of the fiber optic cables 56 to leak light, or a high index material is deposited on the cables 56 to leak light.

The size of the LCD and the number of pixels will determine the widths of the fiber optic cables 56 used.

In certain embodiments, filters or masks may be used to minimize light exiting a fiber optic cable leaking into an adjacent column.

Any number of LEDs may be used to provide the required brightness for the LCD. Any known technique to improve the light coupling efficiency of the LEDs to the light guides may be used, such as using a high index optical epoxy to bond the light source to a surface of the light guide. Numerous issued patents describing light guides and LCDs provide techniques for improving light extraction efficiency, and any of these techniques may be employed, as appropriate, in the present invention. These patents include U.S. Pat. Nos. 6,094,283; 6,079,838; 6,078,704; 6,073,034; 6,072,551; 6,060,727; 6,057,966; 5,975,711; 5,883,684; 5,857,761; 5,841,494; 5,580,932; 5,479,328; 5,404,277; 5,202,950; 5,050,946; 4,929,062; and 4,573,766, all incorporated herein by reference.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A color liquid crystal display comprising:
   a plurality of layers including a liquid crystal layer; and
   a plurality of backlight layers comprising at least one first light guide layer for coupling only a red light, at least one second light guide layer for coupling only a green light, and at least one third light guide layer for coupling only a blue light, said first light guide, said second light guide, and said third light guide being positioned to illuminate a surface of said liquid crystal layer, said first light guide layer, said second light guide layer, and said third light guide layer lying in a different plane,
   wherein each of said first light guide layer, said second light guide layer, and said third guide layer is a transparent sheet, said first light guide layer overlying said second light guide layer, and said third light guide layer overlying said second light guide layer.

2. The display of claim 1 further comprising a red LED optically coupled to said first light guide layer, a green LED optically coupled to said second light guide layer, and a blue LED optically coupled to said third light guide layer.

3. The display of claim 1 wherein first light guide layer comprises a plurality of light guides receiving red light, said second light guide layer comprises a plurality of light guides receiving green light, and said third light guide layer comprises a plurality of light guides receiving blue light.

4. The display of claim 1 wherein said first light guide, said second light guide, and said third light guide have deformities to cause light to leak out of each said light guide.

5. The display of claim 4 wherein said deformities are positioned such that light leaks out of each said light guide layer only in areas corresponding to pixel positions.

6. The display of claim 5 wherein said deformities are arranged in columns to coincide with columns of pixels.

7. The display of claim 1 wherein each said light guide layer includes lenses for collimating light exiting each said light guide layer.

8. The display of claim 1 wherein said plurality of layers comprises:
   a first polarizing filter;
   an energizing array;
   a liquid crystal layer; and
   a second polarizing filter.

9. The display of claim 8 wherein said energizing array is a thin film transistor array.

10. The display of claim 8 wherein said plurality of layers lacks a color filter.

11. A method performed by a color liquid crystal display, said display comprising a plurality of layers including a liquid crystal layer; and a plurality of backlight layers comprising at least one first light guide layer for coupling only a red light, at least one second light guide layer for coupling only a green light, and at least one third light guide layer for coupling only a blue light, said first light guide, said second light guide, and said third light guide being positioned to illuminate a surface of said liquid crystal layer, said first light guide layer, said second light guide layer, and said third light guide layer lying in a different plane, wherein each of said first light guide layer, said second light guide layer, and said third guide layer is a transparent sheet, said first light guide layer overlying said second light guide layer, and said third light guide layer overlying said second light guide layer, said method comprising:

energizing a red light emitting diode (LED) optically coupled to said first light guide layer;

energizing a green LED optically coupled to said second light guide layer;

energizing a blue LED optically coupled to said third light guide layer; and selectively controlling said liquid crystal layer to display an image comprising a combination of red, green, and blue light.

12. The method of claim 11 wherein said first light guide, said second light guide, and said third light guide have deformities to cause light to leak out of each said light guide, and wherein said energizing each said LED causes light to reflect off said deformities and exit each said light guide only in areas corresponding to pixel positions.

13. The method of claim 12 wherein said deformities are arranged in columns to coincide with columns of pixels.

14. The method of claim 11 wherein said plurality of layers comprises a first polarizing filter, a thin film transistor array, said liquid crystal layer, and a second polarizing filter, said selectively controlling said liquid crystal layer comprising:

selectively activating transistors in said thin film transistor array.

15. The method of claim 11 wherein energizing the red LED, energizing the green LED, and energizing the blue LED comprise energizing the red LED, the green LED, and the blue LED concurrently.

16. The display of claim 1 further comprising:

a red light source coupled to the first light guide layer;

a green light source coupled to the second light guide layer; and a blue light source coupled to the third light guide layer;

the red light source, the green light source, and the blue light source being concurrently energized to emit their respective light colors.

* * * * *